United States Patent Office 3,033,959
Patented May 8, 1962

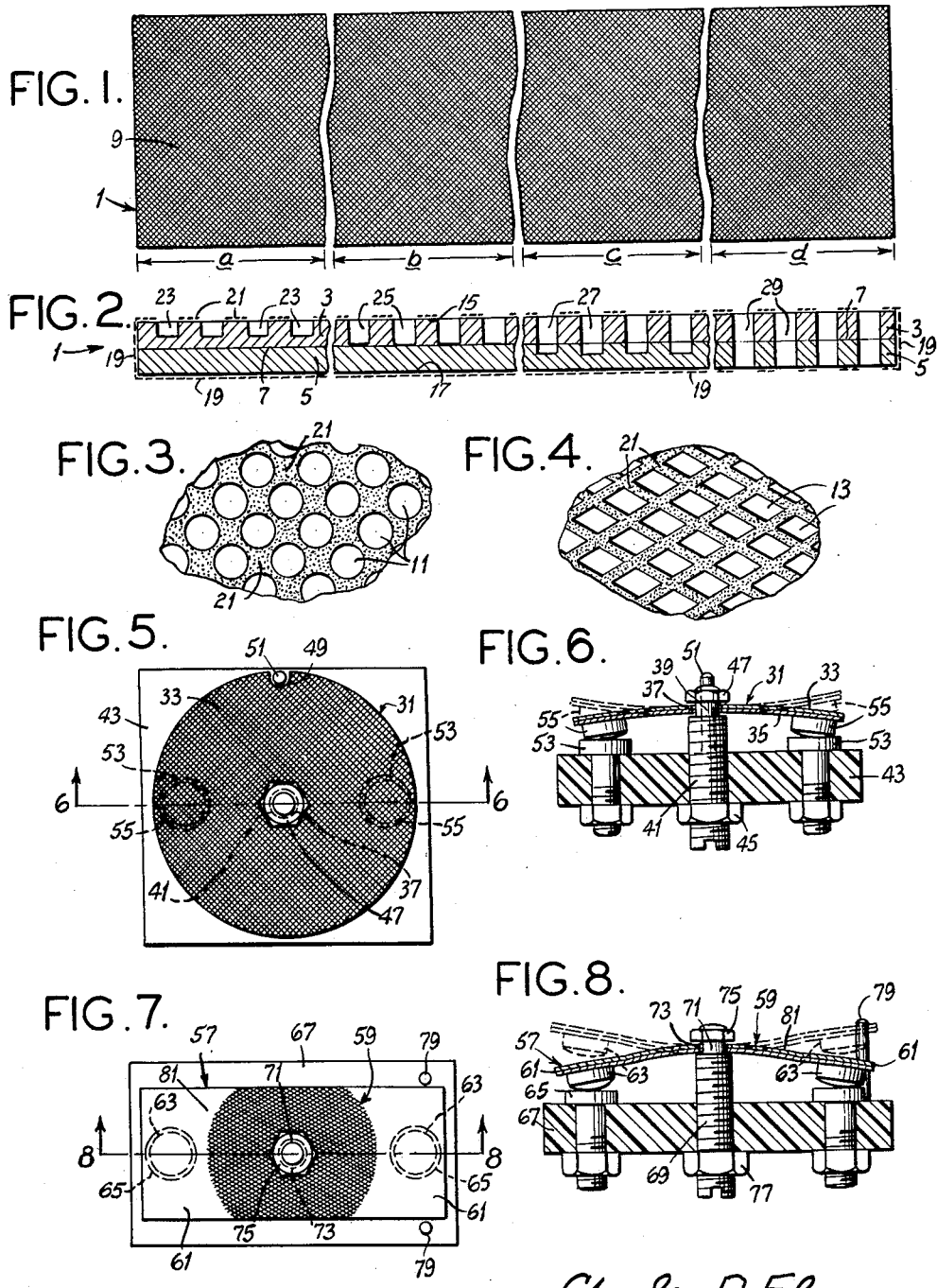

3,033,959
THERMOSTATIC ELECTRICAL RESISTANCE ELEMENTS AND THEIR METHOD OF MANUFACTURE
Charles D. Flanagan, Attleboro, Mass., assignor to Texas Instruments Incorporated, Dallas, Tex., a corporation of Delaware
Filed Apr. 8, 1959, Ser. No. 805,041
14 Claims. (Cl. 200—113)

This invention relates to thermostatic electrical resistance elements and to their method of manufacture, and with regard to certain more specific features, to means for controlling the resistivity of thin flexible elements of this class.

Among the several objects of the invention may be noted the provision of a method which may be accurately performed upon comparatively thin flexible thermostatic electrical resistance elements, whereby their electrical resistances may be accurately increased; the provision of both slow- and snap-acting bimetallic flexible thermostats in which resistances throughout various parts thereof may be conveniently differentiated, without the incorporation of extraneous means for the purpose such as might interere with proper thermostatic action; the provision of such thermostatic elements having uniform or other predetermined current densities throughout selected areas; and the provision of controlled-resistance snap-acting thermostatic elements in which the means for obtaining improved resistance characteristics also improves the snap-acting properties thereof by lowering or equalizing stresses therein such as may have been introduced in preliminary deforming operations. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which several of various possible embodiments of the invention are illustrated, FIG. 1 is a diagrammatic broken plan view of segments $a$, $b$, $c$ and $d$ of a sheet of thermostatic material incorporating various forms of the invention;

FIG. 2 is a greatly enlarged diagrammatic broken cross section showing from left to right the characteristics of the various segments $a$, $b$, $c$ and $d$ of the sheet shown in FIG. 1;

FIG. 3 is a greatly enlarged plan view of a part of a sheet like that shown in FIG. 1 and illustrating one form of regular pattern for a congeries of recesses;

FIG. 4 is a view similar to FIG. 3, showing another form of regular pattern for such a congeries;

FIG. 5 is an enlarged plan view of a thermostatic switch employing a disc type snap-acting element made according to the invention;

FIG. 6 is a vertical section taken on line 6—6 of FIG. 5;

FIG. 7 is an enlarged plan view of a thermostatic switch employing another form of snap-acting thermostatic element made according to the invention; and FIG. 8 is a vertical section taken on line 8—8 of FIG. 7.

Corresponding reference characters indicate corresponding parts throughout the several views of the drawings.

As is known, a method of obtaining a desired resistance to current flow through a thermostatic sheet is to select one set or another of bimetallic components having one or another set of specific resistances and/or to change the rectangular cross sections of these by change in breadth presented to current flow or thickness or both. However, resort to changes in these variables often involves antithetical requirements resulting in complications of design. By means of the present invention, resistances in thin flexible thermostatic sheets may readily be varied without the introduction of such complicating factors in design.

Referring now more particularly to the drawings, there is shown in FIG. 1, for example, a flexible composite sheet 1 of bimetallic material in respect to which the invention will be described. As shown in FIG. 2, the bimetallic components of sheet 1 are numbered 3 and 5, these being bonded along an interface 7 in the usual manner in which such composite thermostatic sheets are prepared. The sheets 3 and 5 may be of equal or unequal thicknesses. The invention has the most pronounced advantages when the sheet is comparatively thin, as for example, several thousandths of an inch in thickness. For thermostatic purposes, the bimetallic components 3 and 5 of sheet 1 have different coefficients of thermal expansion. For example, component 3 may be composed of a material having a relatively low coefficient of thermal expansion, such as Invar. Component 5 may be composed of a material of relatively high coefficient of thermal expansion, such as an alloy consisting of 22% nickel, 3% chromium and the remainder iron. However, as is known, any one of many other various combinations may be employed for the purpose of producing flexing movements of the sheet 1 in response to temperature change. One method of heating composite sheets such as herein contemplated is to subject them to current flow of an amount which, according to the resistance of the sheet, will generate heat to raise the temperature so as to cause flexing.

Referring again to FIG. 1, there is shown diagrammatically at numeral 9 a congeries of many small accurately formed empty reticulations, recesses, openings or holes, as the case may be, each of which may have any desired outline, and all of which are preferably arranged in accordance with a regular screen pattern. These are discrete in the sense that individuals thereof do not connect with one another, all being within a continuous lattice of material around them. Such a congeries of recesses may be imposed upon one or both faces of the sheet 1. In any event, a screen or lattice form of approximately the original face of the sheet should surround all of the openings of the congeries, which requires accurate outlining of the openings with as clean-cut edges as possible. The result is that the lattice has a substantial number of crossings throughout the congeries of openings, as shown in FIGS. 3 and 4. In the present example, the punctured surface is imposed on the upper face and is accomplished by etching through a resist screen. The shapes of the openings comprising the congeries may be circular, as shown at 11 in FIG. 3, or diamond-shaped as shown at 13 in FIG. 4, or any one of many other shapes which are preferably geometrically repetitively regular. The etching is accomplished in any known manner, such as by applying to the surface a grid pattern or lattice of etch-resistant or so-called resist material, either photographically or by known printing techniques. By etch-resistant or resist is meant a material which after application will resist the action of a material adapted to etch the sheet 1. Thus the resist material may be an adhered developed photographic emulsion, a greasy ink or the like in the form of an accurrate lattice on the original face of the sheet, the lattice exposing the openings which are to puncture the original surface of sheet 1. The resist pattern shown by lattice 21 in FIGS. 3 and 4 will be such as to outline such interstitial shapes as 11, 13 or the like. These shapes define exposed parts of the original metallic surface on which the resist pattern is imposed.

After the resist lattice pattern 21 has been applied, the surface 15 upon which it is located is treated chemically with a suitable etching acid, electrolytically or the like, in order to bring about an etching action in the exposed areas 11, 13 or the like. Since chemical and electrolytic etching techniques are known, further elaboration in this regard will be unnecessary. They provide for etching recesses, the margins of which are sharp and well defined, so that a substantial part of the sheet at or near the original face of the sheet is maintained. If the entire sheet 1 is to be immersed in the appropriate chemical acid or electrolytic fluid, it will also be desirable to cover its edges and the other surfaces 17 with a patternless covering of resist material, as indicated by the dots 19 in FIG. 2. A relatively short immersion will result in the production of relatively shallow sharply defined recesses such as indicated at 23 in FIG. 2, wherein component 3 may be only partially penetrated. Such partial penetration is indicated for segment a of FIG. 1. Or the penetration may be deeper so as to reach the interface 7, as indicated at 25 in FIG. 2 for segment b of FIG. 1. If desired, the etching may be continued to penetrate into component 5, as indicated at 27 in FIG. 2 for segment c of FIG. 1. Finally, if desired, the etching may be continued until complete penetration is accomplished through both components 3 and 5, as indicated at 29 in FIG. 2 for segment d of FIG. 1.

It will be understood that FIGS. 1 and 2 are diagrammatic, and that the pattern 9 and etched portions 23, 25, 27 and 29 may be of any form, such as suggested in FIGS. 3 and 4, or others. The various depths of etching 23, 25, 27 and 29 may be obtained simply by allowing the appropriate segments a, b, c, d to be subject the the etching action for appropriate times. After etching has been completed, the resist pattern 21 and the continuous resist 19 area may be removed by application of a suitable solvent or other means, if desired, although such removal is not necessary in all cases. In any event, a grid pattern of the original face of the sheet 1 is left surrounding each and every etched recess or opening.

As an example of the dimensions that may be employed, the composite strip 1 may be .008″ thick and etched to a bottom depth of approximately .003″–.004″ into its low-expansion component such as 3, a pattern being employed involving approximately 17,000 depressions or recesses per square inch. The exact numbers are not critical, except that, as illustrated in FIGS. 3 and 4, there shall be a large enough number of openings in the congeries areas of the same as to establish a lattice of material having a large enough number of lattice crossings in the congeries area to provide a substantially even distribution of resistance. This results in an even distribution not only of current and a uniform heating but also uniform stress distribution, as otherwise made clear herein. Referring now to FIGS. 5 and 6, these show a snap-acting bimetallic switch construction formed of such material. In these figures, numeral 31 represents a thermostatic disc, ⅝″ in diameter, which has been punched from a material such as shown in segment a and which, when unheated, has been deformed in a press to take the dome shape shown by the solid lines in FIG. 6. The low-expansion component 33 of this disc is uppermost and its high-expansion component 35 is lowermost, the former having been etched on its upper surface, as stated. Such a disc, when heated by current flowing through it, at a predetermined temperature will snap to the dotted-line position shown.

Ordinarily a low-expansion component such as 33 is generally the one having the least specific resistance. By etching its surface, as described, its cross section presented to flow of current is decreased, thereby increasing its total resistance so as to be equal or more nearly equal to that of the high-expansion component 35.

In practice, the disc may be provided with a hole 37 for loosely mounting it upon a reduced portion 39 of a post 41 which is adjustably threaded into an insulating base 43. The post is adapted to be locked in adjusted position by nut 45. Collar means 47 holds the disc 31 captive on the post. The disc may be notched on its margin, as shown at 49, for loose cooperation with a pin 51 extending from the base 43, so as to prevent rotation on the post.

The base 43 also carries fixed contacts 53 which are engaged by movable contacts 55 welded in diametrically opposite positions on the underside of the disc 31. Under conditions of normal current flow, the disc is unheated. Under overload currents, it heats and its temperature rises, so that it deflects with snap action to the dotted-line open-circuit position. Upon cooling, it will snap back to the closed-circuit position. As is known, the dome shape may be so modified that, after snapping to the dotted-line position, it will maintain the latter until reset by application of external force.

In view of the above, it will be seen, as to the application of the invention illustrated in FIGS. 5 and 6, that the primary purpose of the accurately etched fine pattern is to increase the resistance of the disc 31 by decreasing the cross section of its component 33, without entirely destroying its original face. In other words, some continuum of material near the original flat face is desired around the openings in the congeries. Thus the result is different from, say, sandblasting the entire face which has the opposite effect of producing on the face of a sheet a depressed surface continuum surrounding raised islands of face material. According to the present invention, a raised continuum of face material surrounds island depressions or holes and as a result varying depths of the depressions may be attained without changing the thickness of the plate as usually measured, say by flat-faced micrometer calipers. In the case of ordinary sandblasting without a resist lattice, as the sandblasting operation is increased beyond a very small amount having little electrical-resistance-change effect, the raised islands become worn substantially below the original surface of the sheet, which may undesirably change the thermostatic activity of the plate. By means of the present invention the thermostatic activity of the plate may be better maintained while substantially changing its resistance. Thus, for example, in the case of a ⅝″ disc which is .008″ thick and treated as described, the resistance may be increased from .0030 ohm without etching, to .0045 ohm with etching as described. This is a 50% increase which will considerably accelerate the time at which the disc will snap in response to current application, without having its snapping characteristics seriously interfered with. Thus the advantage is obtained without damage to the disc as a thermostat, and in fact with an additional advantage in that the etching incidentally tends to equalize undesirable stress variations which may appear in various parts of a disc during a deforming operation thereon.

In FIGS. 7 and 8 is shown another form of the invention. In this case an initially rectangular bimetallic sheet 57 is deformed, so as to have a circular mid portion 59 of dome shape. This leaves ends or ears 61, on the lower surfaces of which are attached movable contacts 63. These are engageable and disengageable with a fixed contact 65 in an insulating base 67. The latter carries an adjustable threaded post 69, having a reduced portion 71 located in a central hole 73 of the dome 59. A collar 75 holds the sheet 57 loosely captive on the post. A nut 77 is adapted to lock the post 69 in any adjusted position. Pins 79, extending from the base 67 and flanking the sheet 57, are adapted to prevent its rotation. In response to normal currents, the sheet 57 is unheated and in its resulting cooled condition maintains the solid-line conformation shown in FIG. 8. In response to overload current and heating, it snaps to the open-circuit position shown in dotted lines in FIG. 8.

In the FIGS. 7 and 8 form of the invention, the etching process above described is applied only to the deformed area of the composite sheet 57. This has the effect of increasing the resistance of the dome portion 59 only, without changing the resistance of the ends 61. The result is similar to that disclosed in United States Patent 2,860,208, which is to say that the end portions 61 of the sheet 57 are left in a condition of high conductivity for uniform current density throughout their areas. In the dome shape 59, the current density is increased in the upper component 81 by reason of the reduction in the amount of material therein effected by the etching process. Thus the objects set forth in the construction shown in said patent are more conveniently attained by use of the present invention, and, in addition, the uneven stresses incurred in forming a dome such as 59 are reduced, thus improving the action and extending the life of the thermostat.

Another advantage of the invention is that it provides means for readily obtaining added resistance for heating purposes in local areas subject to local cooling effects, known as heat sinks, whereby unduly low operating temperatures ordinarily expected in such areas may be offset. Another advantage of the invention is that uniform current density and uniform heat distribution are obtained throughout such a portion of a thermostatic element as is covered by the congeries of openings and current-carrying crossings interspersed therein.

It will be clear from the above that many variations of the invention are possible, such as applying the etched pattern to both sides of a sheet, either of the same pattern or different patterns, and etching either part-way or all the way through the sheet from opposite sides. It will also be clear that various patterns may be used throughout any or all face portions of a sheet, whether deformed or not. Moreover, the invention is applicable to sheets which function either as slow-acting or snap-acting thermostats.

While, as above pointed out, the results obtained by means of the invention are different from the results obtained simply by roughening and reducing a surface as by ordinary sandblasting, it is to be understood that the results may be obtained by other processes such as fine mechanical blanking, liquid honing or blasting through a resist, stencil, lattice or the like, but the described etching through a resist lattice is preferred.

In any event, by means of the present invention, the resistance-increasing depressions are in the nature of depressed areas interspersed in a grid-like higher surface, all portions of which higher surface are connected in a continuum for current flow therethrough. In processes such as ordinary sandblasting above referred to, without use of a resist grid or stencil a depressed continuum surrounds raised islands. This difference is of importance as regards the ability to effect electrical resistance control without damage to the operating characteristics of the device as a thermostat. The geometrically repetitively regular characteristic of the lattice described is an advantage in facilitating design calculations required to predict resistances desired in sheets to which the invention may be applied.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A thermostatic electrical resistance material comprising a flexible composite conductive sheet adapted to flex upon heating, at least a portion of at least one face of a conductive part of which has a congeries of closely spaced discrete recesses extending part-way only through the sheet, the sides of said recesses outlining a continuously connected lattice of conductive material surrounding the recesses, whereby the electrical resistance of the sheet is substantially increased above its unpunctured value.

2. A flexible resistance material according to claim 1, wherein the thickness of the sheet is on the order of several thousandths of an inch and the number of recesses is on the order of several thousand per square inch.

3. A thermostatic electrical resistance material comprising a flexible composite sheet having components of relatively high and low coefficients of thermal expansion respectively and thereby adapted to cause flexing of the sheet upon temperature change, at least one of said components being electrically conductive, an area of the face of at least one of such electrically conductive components being perforated by a congeries of a substantial number of closely spaced small recesses, the number of such recesses which constitute the congeries being such as to form over said area a fine lattice mesh of conductive material having a substantial number of lattice crossings interspersed throughout the area occupied by the congeries of recesses, the number of openings and interspersed crossings in said area being such as to provide substantially uniform current and stress distribution throughout said area.

4. A thermostatic electrical resistance material according to claim 3, wherein the numbers of said recesses and of said lattice crossings are on the order of several thousand per square inch respectively throughout said area.

5. A thermostatic electrical resistance material according to claim 4, wherein the thickness of the composite sheet throughout said area is on the order of several thousandths of an inch.

6. A thermostatic electrical resistance material according to claim 3, wherein the area of said perforated portion interspersed with the lattice crossings occupies only a portion of the total area of the sheet, the remaining area of the sheet being unperforated by such recesses and unoccupied by any lattice crossings.

7. A thermostatic electrical resistance material according to claim 6, wherein the unperforated area of the sheet is in two portions flanking the perforated area, said unperforated flanking portions being adapted to supply current for passage through said perforated area.

8. A thermostatic electrical resistance material according to claim 3, wherein said recesses forming the perforations extend only partway through the sheet.

9. A thermostatic electrical resistance material according to claim 3, wherein said recesses forming the perforations extend entirely through the sheet.

10. A thermostatic electrical resistance material according to claim 3, wherein both of said components are electrically conductive, one having relatively lower specific resistance than the other, at least said component having the relatively lower specific resistance having said recesses formed therein whereby its total resistance is increased.

11. A thermostatic electrical resistance material comprising a flexible bimetallic sheet having components of relatively high and low coefficients of thermal expansion respectively, an area of one component being perforated by a congeries consisting of a substantial number of closely spaced small recesses, the number of such recesses which constitute the congeries being such as to form in said area a lattice having a substantial number of closely spaced lattice crossings interspersed throughout the congeries of recesses, the number of openings and interspersed crossings in said one component being such as to tend to bring its total resistance more closely to that of the other component than said one component would have without the recesses therein, and to provide a uniform current distribution therein.

12. A thermostatic electrical resistance material according to claim 11, wherein the numbers of said recesses and lattice crossings are on the order of several thousand per square inch respectively.

13. A thermostatic electrical resistance material according to claim 12, wherein the total thickness of the bimetallic sheet is on the order of several thousandths of an inch.

14. A thermostatic electrical resistance material according to claim 1, wherein the flexible composite conductive sheet is deformed to produce snap action upon flexing.

References Cited in the file of this patent

UNITED STATES PATENTS

| | | |
|---|---|---|
| 798,413 | Howard | Aug. 29, 1905 |
| 1,809,293 | Claytor | June 9, 1931 |
| 2,251,278 | Hays et al. | Aug. 5, 1941 |
| 2,283,170 | Batcheller | May 19, 1942 |
| 2,727,962 | Vaughan | Dec. 20, 1955 |
| 2,757,256 | Cataldo et al. | July 31, 1956 |
| 2,869,266 | Hirdler | Jan. 20, 1959 |
| 2,887,547 | Marquis | May 19, 1959 |

UNITED STATES PATENT OFFICE
CERTIFICATE OF CORRECTION

Patent No. 3,033,959                        May 8, 1962

Charles D. Flanagan

It is hereby certified that error appears in the above numbered patent requiring correction and that the said Letters Patent should read as corrected below.

Column 1, line 25, for "interere" read -- interfere --; column 3, line 15, for "surfaces" read -- surface --; line 34, for "the", first occurrence, read -- to --.

Signed and sealed this 4th day of September 1962.

(SEAL)
Attest:

ERNEST W. SWIDER                       DAVID L. LADD
Attesting Officer                         Commissioner of Patents